No. 729,775. PATENTED JUNE 2, 1903.
A. E. KRAUSE.
METHOD OF REMOVING OIL OR OILY MATTER FROM WATER.
APPLICATION FILED JUNE 3, 1902.
NO MODEL.
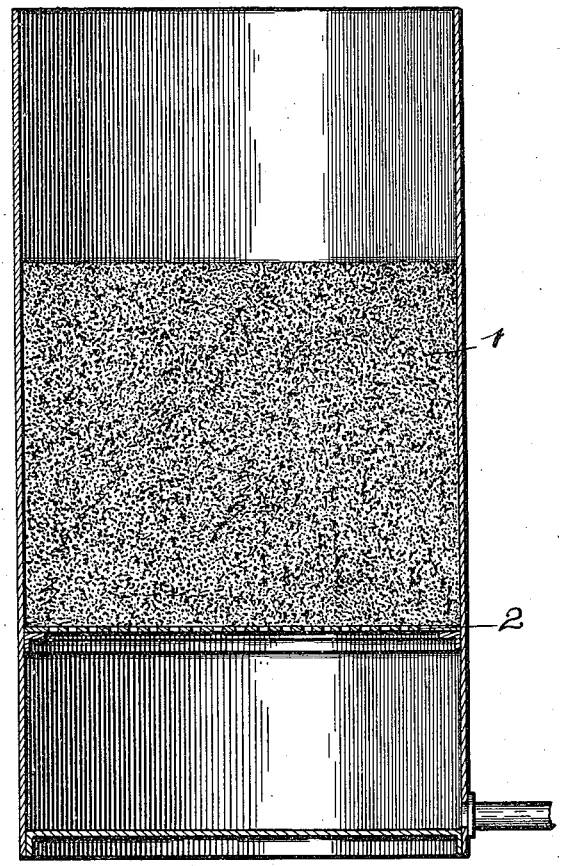
WITNESSES:
INVENTOR
Arthur E. Krause
BY
ATTORNEYS No. 729,775. Patented June 2, 1903.

UNITED STATES PATENT OFFICE.

ARTHUR E. KRAUSE, OF JERSEY CITY, NEW JERSEY.

METHOD OF REMOVING OIL OR OILY MATTER FROM WATER.

SPECIFICATION forming part of Letters Patent No. 729,775, dated June 2, 1903.

Application filed June 3, 1902. Serial No. 110,039. (No specimens.)

*To all whom it may concern:*

Be it known that I, ARTHUR E. KRAUSE, a citizen of the United States, residing at Jersey City, in the county of Hudson and State of New Jersey, have invented a certain new and useful Method of Removing Oil and Oily Matter from Water; and I do hereby declare the following to be a full, clear, and exact description of the same, such as will enable others skilled in the art to which it appertains to make and use the same.

My invention relates to a method of removing greasy and oily matter from water or steam, and is particularly intended for removing oil and grease from exhaust-steam of engines, pumps, and the like or from the water of condensation, so that the water may be used again in the boiler without carrying oil into it.

In an application for United States Letters Patent filed May 23, 1901, Serial No. 61,516, I have described a method of removing oil and oily matter from water, which consists in mixing with the oily water a substance insoluble or only sparingly soluble in water, but which has the power of segregating from the water oil and oily matter contained therein by physical attraction, and in then separating this purifying substance with the oil carried by it from the water. The collection and segregation of the oil from the water in this process is not a chemical action, but is physical in its nature. I have discovered that magnesium bodies—such as the oxid, the hydrated oxid, the carbonate, and the silicate of magnesium—possess to a high degree this property of segregating oil from water by physical action. This property is also possessed by the magnesium minerals known as "magnesite," "serpentine," "chrysotile," "baltimorite," "picrolite," and other allied minerals. The process herein described in so far as it relates to the separation of oil, grease, and the like from water is a particular method of carrying out the process of my said application, Serial No. 61,516; but this process also comprises the separation of oil and grease from steam as well as from water.

For separating oil and oily or greasy matter from water I employ a filter the filtering material of which is composed of one of the substances above mentioned in fibrous, granular, or sandy form—such as fibrous serpentine, serpentine sand, granular magnesite, or any inert substance—such as coke, coarse gravel, or sawdust—covered or coated with the purifying material above mentioned, the inert substance being used to afford as great a surface of contact for the active material as possible. The accompanying drawing shows such a filter, 1 being the bed of sand or purifying material of the character specified. The sand bed may rest upon a porous or perforated support 2. Water to be purified or freed from the oil and oily matter is admitted to the space above the sand bed, and by trickling through such bed and through its support is purified, the particles of oil or grease being physically attracted or segregated from the water, so that the latter emerges from the bottom of the filter ready for use in a boiler.

Steam carrying oil or grease, such as the exhaust-steam of an engine, may be purified in substantially the same manner and by the same means, being passed through a bed or mass of purifying material such as above described.

The process carried out as above described is essentially different from straining or mechanical filtration. Sand filters of ordinary character, it is well known, are quite inadequate for extracting oil from water, owing to the minuteness of the oil particles when in an emulsified condition, and the same is true of filters of much closer texture—such, for example, as cloth, linen, or jute—these being substances which do not possess the peculiar property hereinbefore mentioned of segregating the oil by physical attraction; but when a substance having this property is employed as a purifying agent the oil or grease in the water or steam is attracted and retained by the particles of purifying material, the water or steam passing through clear and the oil or grease remaining with the purifying material.

Where ordinary sand and other filters have heretofore been used for removing oil from condensed water, it has been found necessary to produce a chemical precipitate in the water, so that this precipitate would gather up the oily matter and become sufficiently bulky to be retained by the filtering medium. Where no such precipitate is used, the oily matter in the water will pass through even the finest sand or other straining material without being retained to any practical extent.

What I claim is—

1. The herein-described process of purifying water or steam of oil or grease, which consists in passing a mixture of oil or grease and water or steam through a layer of magnesium body of the character described, viz., one that is insoluble or only sparingly soluble in water, thereby causing said substance to gather the oil particles by physical action, and to hold the same from passing through the purifying material with the water or steam.

2. The herein-described process of purifying water or steam of oil or grease which consists in passing a mixture of oil or grease and water or steam through a layer of serpentine sand.

3. The herein-described process of purifying water or steam of oil or grease which consists in passing a mixture of oil or grease and water or steam through a layer of material which has a greater physical attraction for the oil than the water or steam has, substantially as described.

In testimony whereof I affix my signature in the presence of two witnesses.

ARTHUR E. KRAUSE.

Witnesses:
H. M. MARBLE,
NICHOLAS SELVAGGI.